United States Patent [19]

Guillon et al.

[11] Patent Number: 4,790,900

[45] Date of Patent: Dec. 13, 1988

[54] APPARATUS FOR PRODUCING A FIBER WINDING OF VARYING WIDTH

[75] Inventors: Daniel Guillon; Alain Bricard, both of Chambery, France

[73] Assignee: Vetrotex Saint-Gobain, c/o Saint Gobain Recherche, Aubervilliers, France

[21] Appl. No.: 847,389

[22] Filed: Apr. 2, 1986

[30] Foreign Application Priority Data

Apr. 3, 1985 [FR] France ................. 85 05056

[51] Int. Cl.⁴ ............................................. B65H 57/02
[52] U.S. Cl. ..................... 156/441; 156/425; 156/446; 242/157 R
[58] Field of Search ............... 156/166, 167, 169, 172, 156/173, 174, 175, 181, 425, 446, 447, 433; 242/157 R, 157.1, 2, 3, 7.02, 7.21, 7.22, 7.19; 28/212, 213; 226/196, 199

[56] References Cited

U.S. PATENT DOCUMENTS

| 1,289,015 | 12/1918 | Suter | 28/212 |
| 2,011,632 | 8/1935 | Harris | 28/213 X |
| 3,258,378 | 6/1966 | Kelsey | 156/167 X |

FOREIGN PATENT DOCUMENTS 8400351  2/1984  World Int. Prop. O. .......... 156/181

Primary Examiner—Michael Ball
Assistant Examiner—Geoffrey L. Knable
Attorney, Agent, or Firm—Pennie & Edmonds

[57] ABSTRACT

A method and apparatus are disclosed for winding at least a layer of separate fibers or groups of fibers onto a rotating support while modifying the width of the layer by moving the layer between two extreme positions perpendicular to the direction of fiber travel and simultaneously moving each fiber or group of fibers in its own plane of motion, offset in relation to a vertical plane at an angle varying from one plane to the next.

10 Claims, 2 Drawing Sheets

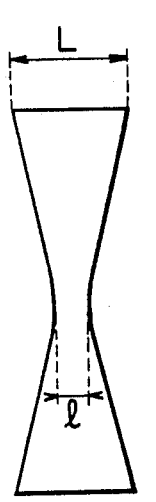
FIG.1a
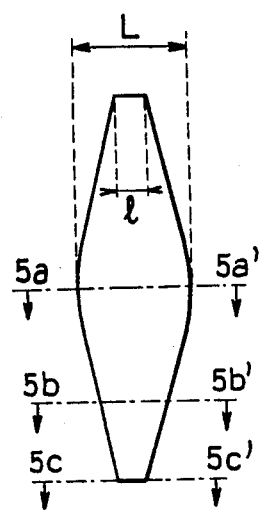
FIG.1b
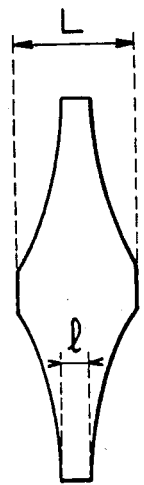
FIG.1c
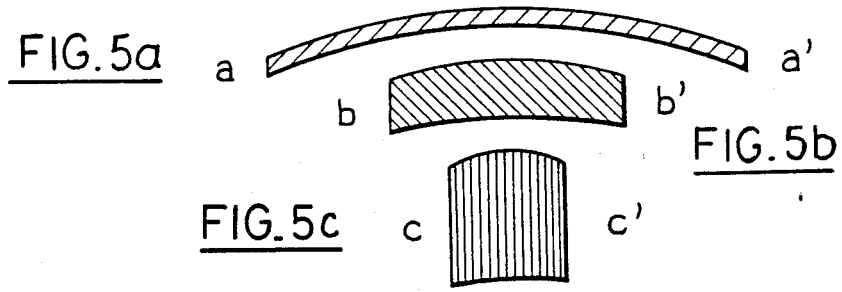
FIG.5a
FIG.5b
FIG.5c
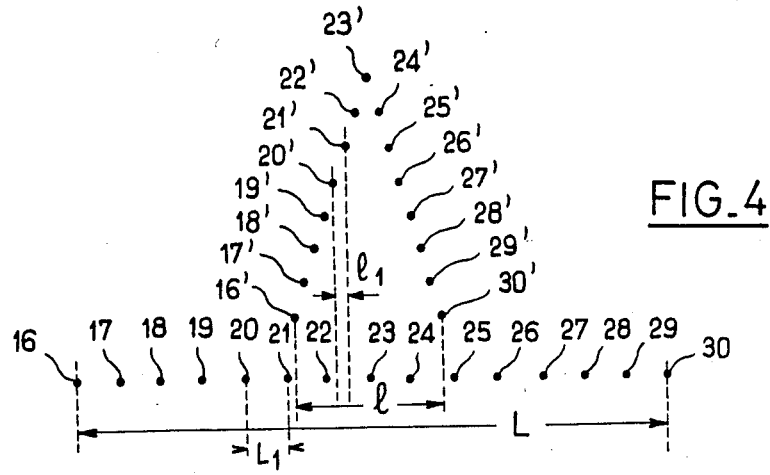
FIG.4

APPARATUS FOR PRODUCING A FIBER WINDING OF VARYING WIDTH

BACKGROUND OF THE INVENTION

This invention relates to the production of objects formed by winding a series of continuous fibers, and more particularly, to the produttion of objects formed by controlling the width of a series of continuous glass fibers impregnated with a resin prior to winding onto a rotating support.

Devices which wind a series of continuous fibers onto a rotating support are known in the art and generally comprise a storage device upon which there are provided a plurality of spools of fiber, a rotating support and a distribution head to assure orderly distribution of the fibers on the rotating support. Illustratively, the fiber may be obtained by drawing a continuous strand of molten glass by mechanical means. The device further comprises a plurality of guide elements for guiding the fibers from the various spools into an essentially planar layer of separate parallel fibers, or separate parallel groups of fibers. These guide elements may also impart a tension to the layer of fibers and direct the layer to a resin impregnation vat unless they have been impregated with this substance during a previous operation.

Depending on factors such as the shape and dimensions of the object to be formed, the distribution head can deliver a single group of fibers, formed by combining the individual fibers, or an essentially planar layer of separate parallel fibers. In this latter case, the distribution head has the structure of a comb provided with parallel teeth that maintain separation between the fibers of the layer during the entire operation of winding the fibers onto the rotating support.

This system of distribution of fibers in layer form does not pose any particular problem when the width of the layer deposited on the rotating support does not need to be varied.

However, in some instances the width of the layer must be varied periodically during the winding, as in the case when windings must be formed on an irregularly shaped mold fastened to the rotating support. In such a case it is possible to obtain variation of the width of the layer by causing the comb structure of the distribution head to rotate slightly about an axis perpendicular to the plane of the layer of fibers and therefore partially align itself with the direction of travel of the fibers.

Unfortunately, this method of rotating the distribution head has limited advantage since such rotation increases the tension of the layer by increasing the friction of the fibers on the teeth of the comb, especially the teeth at the opposite ends of the comb structure. This increase in tension can lead to breakage of fibers and adversely affect the quality of the resulting product.

Furthermore, experience shows that such rotation of the comb structure is only effective to compress a layer of width L to a layer of width 0.5L at most. Difficulties are encountered when it is desired to make objects requiring a much greater reduction of width in the layer.

SUMMARY OF THE INVENTION

In accordance with the preferred embodiment of the present invention, an essentially planar horizontal layer of separate fibers is periodically moved vertically between two extreme positions, such motion being perpendicular to the direction of travel of the advancing fibers. Simultaneously to and in conjunction with this vertical movement of the entire advancing layer, each separate fiber or group of fibers is moved horizontally in its own plane of motion, said plane offset in relation to a vertical plane at an angle varying monotonically from one plane to the next. By such vertical and horizontal movement of the entire layer of fibers, the layer width can be increased as well as decreased.

In accordance with the invention, the layer of fibers enters a first movable guide element comprising two horizontal bars, one displaced slightly above the other, through which the fibers pass in essentially a planar layer. These two bars are associated with a driving element which moves the bars and therefore, the layer in a vertical direction perpendicular to the direction of travel of the layer of fibers. This movement is performed according to a predetermined program. The bars and associated driving element may be mounted on or in close proximity to the distribution head.

The fiber layer also enters the stationary comb structure of the distribution head. This comb structure comprises a series of rods fastened at each of their ends to opposing parallel faces so that the various planes through any two adjacent rods are secant. These rods are angled with respect to the vertical so that any vertical motion of the bars, and therefore the layer, will result in a widening or a narrowing in the separation between individual fibers or groups of fibers in the layer.

It is therefore an object of the present invention to provide a method and apparatus to cause variation of the width of a layer of fibers in much greater proportions than known means allow, without harming the quality of the produced object It is a further object to provide a means to constantly fit the width of the layer or layers to the section of the rotating support.

BRIEF DESCRIPTION OF THE DRAWINGS

These and other objects, features and advantages of the invention will be more readily apparent from the following detailed description of the preferred embodiment of the invention in which:

FIGS. 1a, 1b and 1c are plan views of various objects that can be made according to the invention;

FIG. 4 is a diagrammatic representation of the ends of the rods forming the stationary comb structure of the distribution head represented in FIGS. 2 and 3; and FIG. 5 is a diagram of three cross sectional views of the object represented in FIG. 1b.

DETAILED DESCRIPTION OF THE INVENTION

FIGS. 1a, 1b and 1c illustrate objects of very different shape, illustratively consisting of continuous glass fibers and resins, that may be produced by the present invention. These objects are formed by winding fibers onto a mold fastened to a support rotating about a horizontal axis. The smallest and largest widths P and L of these objects can vary greatly. For example, in the objects depicted in FIGS. 1a, 1b and 1c, P and L have a ratio of 1 to 4.

Figure 2:
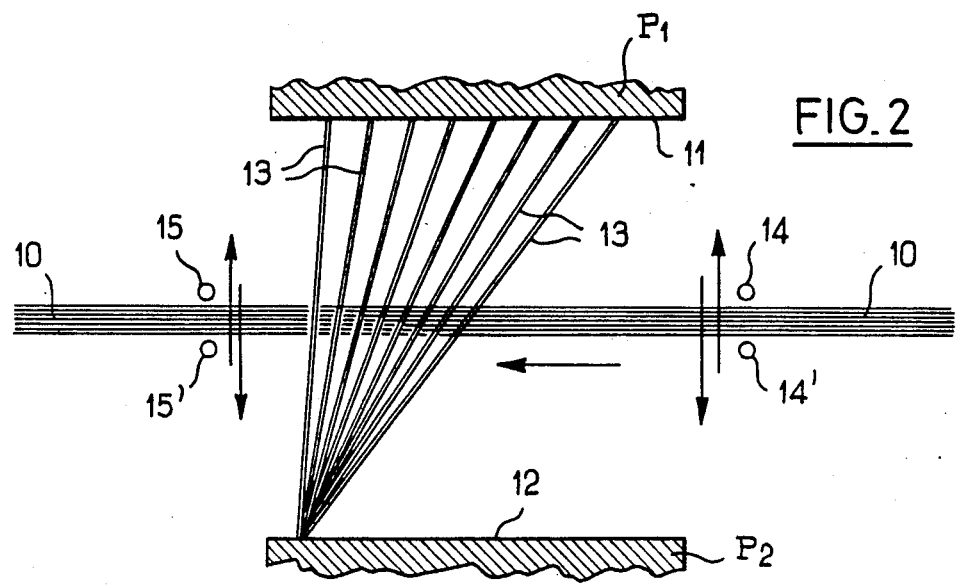
FIG. 2 is a longitudinal section of an embodiment of the device provided with two movable guide elements and a fixed distribution head.
Figure 3:
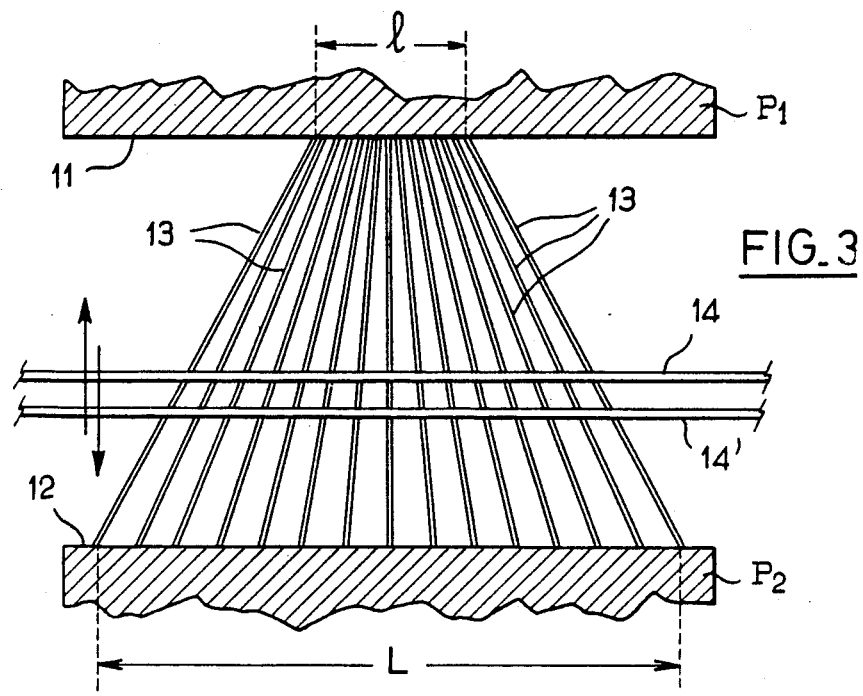
FIG. 3 is a cross section of the device represented in FIG. 2.

Each of the objects depicted in FIGS. 1a, 1b and 1c may be formed by using a distribution head, shown in FIGS. 2 and 3, with a comb structure whose teeth are installed as shown in FIG. 4. Continuous glass fibers, whether previously impregnated with a resin or not, are supplied from spools placed on a storage device (not shown). The various fibers from these spools are brought together by means known in the art to form an essentially planar layer of parallel fibers 10. This layer is directed toward the distribution head comprising two plates $P_1$ and $P_2$, whose opposite faces 11 and 12 are parallel and to which are fastened the ends of a series of rods 13 to define a comb structure. The layer as modified by passage through the comb structure is then wound on a mold (not shown) mounted on a rotating support.

Two pairs of guide elements, or bars 14, 14' and 15, 15' are located upstream and downstream from the comb structure of the distribution head. Fiber layer 10 passes through the comb structure formed by rods 13 in an essentially planar manner due to the restraining effect of bars 14, 14' and 15, 15'. These bars, parallel to each other, are placed on both sides of layer 10, perpendicular to the direction of travel of the layer 10, said direction of travel being indicated by a horizontal arrow in FIG. 2. As indicated by the vertical arrows of FIG. 2, bars 14, 14' and 15, 15' slide vertically on rails (not shown) so as to move layer 10 closer to one or the other of plates $P_1$ and $P_2$ as it passes through the comb structure, thereby controlling the width of layer 10. The reciprocal motion of these bars is controlled by the rotation of the mold support and is coordinated to keep the portion of layer 10 between the two pairs of bars in a plane parallel to faces 11 and 12. The movement of the two pairs of bars may be programmed by any known mechanical or electrical means in order to obtained the desired result. Alternatively, it is possible to guide the layer by a single pair of bars located either upstream or downstream from the distribution head. Stops are fastened to the rails to limit travel between $P_1$ and $P_2$.

The ends of rods 13 are fastened to face 11 of plate $P_1$ such that the orthogonal projection of the distances separating the rod ends on a plane $P_3$ perpendicular to faces 11 and 12 as well as the direction of fiber travel is equal to the minimum width P of the layer 10. The orthogonal projection on the same perpendicular plane of the distances separating the ends of rods 13 fastened to face 12 of plate $P_2$ is equal to the largest width L of the layer 10. These two extreme widths P and L of the layer of fibers are in the ratio of 1 to 4 in the preferred embodiment.

FIG. 4 shows how rods 13 are fastened to parallel plates $P_1$ and $P_2$. Various points 16 to 30 represent the ends of rods 13 as fastened to face 12. Corresponding points 16' to 30' represent the opposite ends of rods 13 as fastened to opposite face 11. Rods 13 are fastened to the faces of plates $P_1$ and $P_2$ such that various planes through any rod intersect the various planes through any adjacent rod.

As shown in FIGS. 2, 3 and 4, rods 13 are installed in a regular and symmetrical fashion. The component of the angle in the diretion of fiber travel at plate $P_2$ between rods 13 and a vertical between plates $P_1$ and $P_2$ decreases monotonically from the center rod to the extreme rod. The orthogonal projection of the distance separating the ends of two adjacent rods, for example rod ends 20 and 21, on a plane perpendicular to faces 11 and 12 as well as the direction of fiber travel is equal to $L_1$. Similarly, the orthogonal projection of corresponding rod ends 20' and 21' on said perpendicular plane is equal to $P_1$. As shown in FIG. 4, the sum of projections $L_1$ is approximately equal to the maximum width L of fiber layer 10, and the sum of projections $P_1$ is approximately equal to the minimum width P of fiber layer 10.

As a result of this arrangement, the width of layer 10 is modified by moving the layer between plates $P_1$ and $P_2$ in synchronism with the winding of the layer on the mold. As obvious to one skilled in the art, adjustment of the width of the fiber layer from P to L and vice-versa can be accomplished with the rods installed in a variety of different ways. For example, the rods may be installed asymmetrically and/or irregularly, possibly resulting in a non-uniform concentration of fibers throughout the layer.

In addition, it is not necessary that the rods be installed in the above discussed manner in which the orthogonal projection of the distances separating the rod ends at one face is equal to a minimum value of P. In other words, the minimum and maximum layer widths do not necessarily have to result from passage of the layer through the comb structure in close proximity to either face 11 or face 12. For example, the rods may form divergent bundles at both faces 11 and 12; and the orthogonal projections of the distances separating the ends of the rods fastened to $P_1$ and $P_2$ may both be equal to L. In such an embodiment, two separate layers of fibers may be guided independently by separate pairs of bars for each layer, resulting in a minimum fiber layer width P obtained in two positions symmetrical with respect to a median plane, parallel to faces 11 and 12.

All of the cross sections of an object produced in accordance with the preferred embodiment of the invention will have essentially the same area, although different cross sections can exhibit quite different shapes. FIG. 5 depicts partial cross sections of the item shown in FIG. 1b. The shape of the sides of the item produced is principlely determined by the walls of a mold fastened to the rotating support.

In a further embodiment of the invention, the rotating support may also be moved longitudinally along its axis of rotation to produce still further variations.

What is claimed:

1. An apparatus for producing a composite product of continuous fibers comprising:
   a mobile guide element for gathering said fibers in a form of at least a layer of fibers;
   a rotatable winding support onto which said layer is deposited;
   a distribution head comprising first and second plates and a plurality of non-parallel rods through which said fibers pass, said plurality of non-parallel rods extending between said first and second plates and forming a three-dimensional comb structure in which said rods are not in the same plane; and
   driving means to drive said mobile guide element in a direction perpendicular to said layer back and forth between two extreme positions as to vary the location at which said fibers pass through said plurality of non-parallel rods of said distribution head and thereby vary the spacing between said fibers upon leaving the distribution head.

2. Apparatus according to claim 1 wherein the mobile guide element comprises first and second sets of bars, each set of bars comprising two bars essentially parallel to each other and placed on opposite sides of the layer of fibers.

3. Apparatus according to claim 2 wherein the first set of bars is placed at an input of the distribution head and the second set of bars is placed at an output of the distribution head.

4. Apparatus according to claim 1 wherein said first and second plates of the distribution head are parallel.

5. Apparatus according to claim 4 wherein the rods are installed such that an orthogonal projection on a plane perpendicular to the direction of travel of the layer of fibers, of distances separating the ends of the rods fastened to the first plate corresponds to a minimum width of the layer.

6. Apparatus according to claim 5 wherein the rods are installed such that an orthogonal projecting, on a plane perpendicular to the direction of travel of the layer of fibers, of distances separating the ends of the rods fastened to the second plate corresponds to a maximum width of the layer.

7. Apparatus according to claim 4 wherein the rods are installed such that an orthogonal projection, on a plane perpendicular to the direction of travel of the layer of fibers, of distances seprating the ends of the rods fastened to the second plate corresponds to a maximum width of the layer.

8. An apparatus for producing a composite product of continuous fibers comprising:

- a mobile guide element for gathering said fibers in the form of at least a layer of fibers;
- a rotatable winding support onto which said layer is wound;
- a distribution head comprising first and second plates and a plurality of rods through which said fibers pass, at least a portion of said fibers passing between differnet rods, said rods being non-parallel and extending between said plates and forming a three-dimensional comb structure in which said rods are not in the same plane; and
- driving means to drive said mobile guide element in a direction perpendicular to said layer back and forth between two extreme positions as to vary the location at which said fibers pass through said plurality of rods of said distriubtion head and thereby vary the spacing between said fibers upon leaving the distribution head.

9. The apparatus of claim 8 wherein said first and second plates are substantially parallel to and on opposite sides of said layer of fibers, and the rods are mounted so that they are in a straight line at said first plate and a "V" shaped line at said second plate.

10. The apparatus of claim 8 wherein the mobile guide element comprises at least one pair of bars that are parallel to one another on opposite sides of the layer of fibers.

* * * * *